Nov. 16, 1965

E. DURHAM 3,217,695

FLUID COOLED HOOD

Filed May 14, 1963

INVENTOR.
Edwin Durham

BY

ATTORNEY

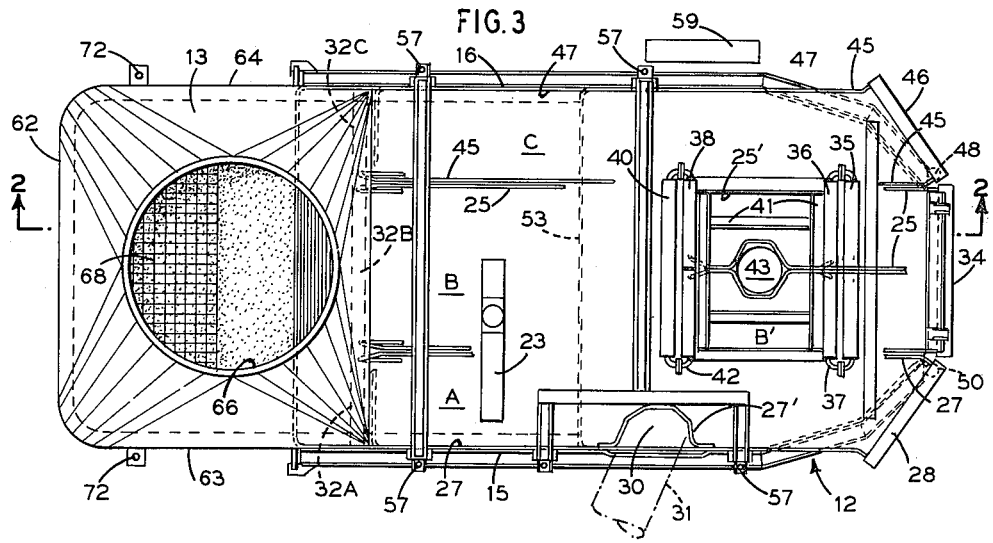

United States Patent Office 3,217,695
Patented Nov. 16, 1965

3,217,695
FLUID COOLED HOOD
Edwin Durham, Wadsworth, Ohio, assignor to The Babcock & Wilcox Company, New York, N.Y., a corporation of New Jersey
Filed May 14, 1963, Ser. No. 280,241
2 Claims. (Cl. 122—7)

The present invention relates to gas cooling apparatus, and more particularly to a fluid cooled duct or hood for confining the flow of hot dust-laden gases from a high temperature source to a chamber where the gases may be further cooled by direct liquid spray contact prior to delivery to dust removal apparatus.

In the basic oxygen furnace for the production of steel a charge of molten iron and steel is refined by a jet of oxygen injected into the furnace. The refining cycle using oxygen requires about 50 to 60 minutes from furnace charge to furnace charge, with 18 to 20 minutes of the cycle required for the oxygen blowing.

During the blowing portion of the cycle a tremendous quantity of gases are released at temperatures of the order of 3000° to 3500° F. The gases usually contain unburned combustibles, such as carbon monoxide, and suspended solids such as iron oxides. The combustibles in the gases are burned by the infiltration or positive introduction of air into the gases during passage through the hood of the present invention. In leaving the furnace the gases are cooled by indirect heat exchange to a cooling fluid and/or by the direct injection of steam or water into the gases so that when the gases are passed through dust separating devices, the gases are at a suitable lower temperature to facilitate separation of dust from the gases. The collected dust, containing iron oxides, is normally returned to the oxygen steel refining furnace for processing.

The cyclic flow of the high temperature gases from the furnace imposes severe operating conditions upon the passageway through which the gases are passed from the furnace. Thus, the walls defining the gas flow passageway heretofore in use have been characterized by short service life due to the drastic temperature changes during operation.

In the present invention the periodic flow of hot gases discharged from the furnace during the oxygen treatment of the steel is directed through a fluid-cooled hood to make a reversal in flow direction before passing into a refractory lined spark box or chamber. Within the chamber the gases are again reversed in their flow direction and cooled by direct contact with sprays of cooling fluid before upward discharge toward dust collecting equipment.

Advantageously the walls of the hood are each lined by a row of fluid cooled tubes where the tubes are arranged in parallel relationship and are joined by metal strips or bars welded to adjacent tubes. The tubes are provided at their inlet ends with pressurized water, as a cooling fluid, with the heated water, combined with a minor amount of steam, discharged from the opposite ends of the tubes to an expansion tank. With the expansion tank maintained at a pressure less than that of the water at the inlet ends of the tubes and heated by absorption of heat from the hot furnace gases passed through the hood, steam will accumulate in the upper portion of the tank. The water is passed from the tank through a circulating pump which discharges into the inlet ends of the tubes to complete the cooling circuit of the tubes. Some of the heat absorbed in the water will be dissipated by radiation, with a controlled portion of the water drawn from the expansion tank passed through a cooler to remove heat from the water, and to thereafter mix the cooled water with water delivered to the inlet ends of the hood. The flow of water to the cooler is regulated in response to changes in the pressure in the expansion tank, and the temperature of the water delivered to the tubes of the hood. In effect the cooler removes substantially all of the heat absorbed by the water circulated for tube cooling purposes in the hood.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

FIG. 2 is an enlarged elevation of the fluid cooled hood shown in FIG. 1; and

FIG. 3 is an enlarged plan view of the hood shown in FIG. 1.

Figure 1:
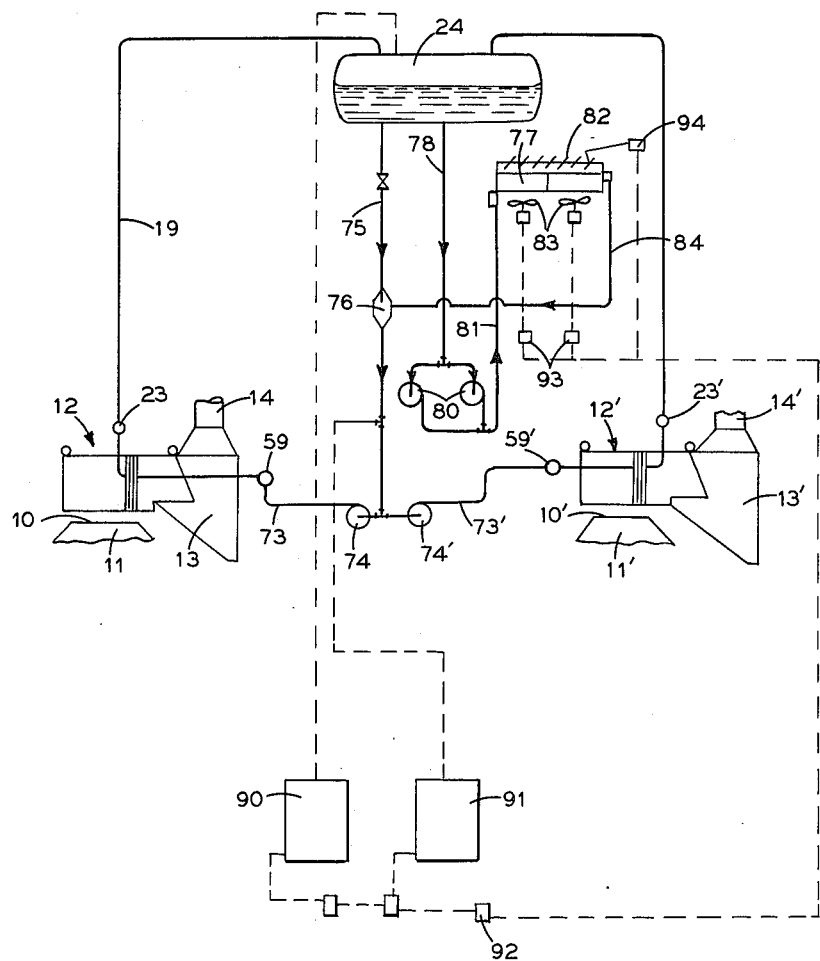
FIG. 1 is a schematic representation of a gas cooling hood and the cooling fluid flow circuit for the hood, constructed and arranged according to the present invention.

In the illustrated embodiment of the invention the open upper end 10 of a basic oxygen furnace 11 is arranged to discharge hot dust-laden gases upwardly into a fluid cooled hood 12. The hood 12 is constructed and arranged to receive the high temperature gases from the furnace 11 and to direct their flow through a flow direction reversal, discharging the gases in a downward direction into a refractory lined chamber 13 where the gases are again reversed in their flow direction to discharge into the lower end of a conduit 14. The reversals in gas flow direction will tend to remove the coarser particles of dust from the entraining gas, and the cooling of the gases will also tend in the same direction. The hot gases are cooled by heat exchange with the fluid cooled walls of the hood 12 and are further cooled by direct contact with sprayed water, which is injected into the gases during their passage toward the dust collectors.

As shown in FIGS. 2 and 3 the hood is formed with gas tight tubular sides 15 and 16, top 17, front wall 18 and rear wall 20 with one end portion 21 positioned immediately above the gas discharge opening 10 of the furnace 11. The opposite end portion 22 of the hood extends into the refractory lined chamber 13 with the gases discharging downwardly from the hood into the chamber where they are cooled by contact with water sprays, before upward discharge from the chamber through the duct 14. The cooled gases may thereafter be passed through dust removal equipment (not shown) before discharge to the atmosphere. The collected dust may be returned to the furnace.

As hereinafter described, the walls of the hood are cooled by the flow of water through the tubes forming the confining walls 15, 16, 17, 18 and 20 with the heated water, substantially at saturation temperature corresponding to the water pressure, passed from a collecting header 23 to a tank or drum 24 by a pipe 19 (see FIG. 1), cooled and returned to the inlet ends of the wall tubes. The flow circuit of the cooling fluid is of the closed type, with very little make-up fluid required. Under such conditions the fluid will be treated to minimize internal tube corrosion.

In the construction shown, the walls of the hood are formed of panels, each of which is constructed of a row of tubes arranged with their axes parallel and the adjacent tubes welded to a bar which closes the intertube space. The construction provides a gas impervious, rigid structure which is shop assembled in suitably sized panels for shipment and are jointed by welding in the field to form the hood.

In the construction shown in FIGS. 2 and 3, the top wall 17 of the hood is formed by three separate panels A, B and C, each of which has a separate horizontally disposed inlet and outlet header. The tubes 25 of the panel B are extended to define the front wall 18 of the hood. The side walls 15 and 16 and the rear wall 20 of the hood are likewise formed from one or more panels, with the tubes of the panels provided with upright inlet and outlet headers.

The panel A forms a portion of the top wall 17 of the hood with the tubes 27 of the panel supplied with water from a horizontally disposed inlet header 28. The inlet header is located substantially at the level of the top wall 17 of the hood and is mounted at an angle to the plane of the front wall 18. Some of the tubes 27' adjacent the outer edge of the panel are displaced upwardly of the plane of the top wall 17 and inwardly of the hood to provide an opening 30 in the roof to accommodate a spot or chute 31 for the delivery of fluxing materials, and the like, to the furnace 11. All of the tubes 27 and 27' open to a horizontally disposed outlet header 32A positioned with its center line in the plane of the axes of tubes 27 and located inwardly adjacent a wall 33 of the chamber 13.

The tubes 25 of the panel B are supplied with water through a horizontally disposed inlet header 34 which is located outwardly adjacent the lower edge portion of the front wall 18 of the hood. The inlet end portion of the tubes 25 extend upwardly to define the front wall 18 of the hood and are bent into the plane of the hood roof 17 to extend rearwardly of the hood to an intermediate horizontally disposed collecting header 35 positioned upwardly adjacent the tubes 25 of the panel. The header 35 is mounted in a fixed position on the panel B and detachably connected with a header 36 by flange conduits 37 connecting the ends of the headers 35 and 36. A row of tubes 25' connect the header 36 with a rearwardly spaced header 38 so as to form a removable section B' of the panel B where the header 38 is end connected by flanged conduits 42 with a fixed position header 40. The tubes 25 extend from the header 40 to an outlet header 32B. With the construction described, the panel section B' including the tubes 25' and the headers 36 and 38 is removable as a unit from section B' for access to the furnace 11. Some of the tubes 33' of the section B' are bent upwardly of the plane and outwardly from the center of the section B' to provide an opening 43 in the roof 17 of the hood 12 to accommodate the insertion of a lance (not shown), for the injection of refining oxygen into the molten metal maintained in the furnace 11. The panel unit or section B' is suitably reinforced by a steel frame 41 attached to the exterior surface thereof and provided with attachments to be engaged by an overhead crane or the like. The section B' may be removed by breaking the flanked conduits 37 and 42 to separate the tube circuits of the movable panel from the stationary tube circuits. Suitable cut-off valves (not shown) may be located within the conduits so that draining of the fluid flow circuits will be unnecessary when the panel section B' is to be removed.

The panel C is formed of a row of tubes 45 opening to a horizontally disposed inlet header 46 which is located on the upper edge of the hood 12 and is inclined from the plane of the front wall 18 in an opposite direction to that of the header 28. The discharge ends of the tubes 45 open to a horizontally disposed outlet header 32C which is in common axial alignment with the outlet headers 32A and 32B.

The side wall panels are formed by a row of tubes 47 opening to an upright inlet header 48 which is positioned directly beneath the end portion of the header 46, and extends from the header 46 to the level of the inlet header 34. From the header 48 the tubes 47 are inclined outwardly and toward the rear of the hood in common upright planes forming the side wall 16 to a position intermediate the length of the hood 12 and spaced from the oxygen lance opening 43. Thereafter the tubes extend to the rear of the hood and are bent to form the rear wall 20. The side wall length of the tubes 47 progressively increases downwardly of the hood so that the rear wall 20 is formed by the tubes 47 and is inclined downwardly into the chamber 13. All of the tubes 47, after forming the rear wall 20 of the furnace, are then bent forwardly of the hood to define the side wall 15 and are symmetrically arranged but of opposite hand with respect to the side wall 16 to open into an upright discharge header 50 positioned beneath the inner end of the header 28. Some of the upper tubes in the side wall 15 are bent outwardly of the plane of the wall and downwardly to define an opening 30' in the side wall 15 which cooperates with the opening 30 in the panel A to accommodate the flux chute 31.

Some of the lowermost tubes 52 in the side wall 16 are bent to extend transversely of the hood at a position intermediate its length, as at 53. These tubes are then bent forward along the wall 15 to interconnect the upright inlet header 48 with the outlet header 50. The section 53 of the tubes 52 cooperate with the upper end of an inclined bottom wall 54 of the chamber 13 to separate the generally open bottom of the hood into a gas inlet 55 and a gas outlet 56 to and from the hood.

As shown in FIGS. 1, 2 and 3 the tubular panels defining the walls of the hood are joined, as by welding, to form a gas tight hood structure to confine and direct the flow of hot gases from the furnace 11 to the chamber 13. The hood structure is suitably reinforced by structural support members, with the entire hood unit supported by rods 57 from overhead structural steel 58.

The chamber 13 is constructed of metallic plates 60 lined by a layer of refractory material 61. As shown, the rear wall 62 and the side walls 63 and 64 of the chamber lie in upright planes with the spacing between the side walls 63 and 64 being substantially equal to the distance between the side walls 15 and 16 of the hood 12. The upper end portion of the chamber is constructed as a transition member 65 tapering from a generally square horizontal cross-sectional configuration to a circular horizontal cross-section of reduced flow area at the chamber outlet 66 opening to the duct 14. The bottom wall 54 of the chamber is of generally uniform width corresponding with the distance between the walls 15 and 16 of the hood 12 and is inclined downwardly to a position horizontally spaced from the rear wall 62. A dust outlet 67 is formed between the lower ends of the bottom wall 54 and the rear wall 62 for the continuous or periodic removal of dust collected in the chamber 13. A grid 68 is located above the dust outlet 67 to intercept any large lumps or chunks of material which may accumulate in the chamber. A door 70 is formed in an opening 71 in the rear wall 62 immediately above the grid 68 for the removal of any lump material which may accumulate on the grid. As shown in FIG. 3 the chamber 13 is suspended by rods 72 from the overhead structural steel work 58 so that little if any relative movement will occur between the hood 12 and the chamber 13. Suitable simple seals (not shown) may be inserted between the edges of the hood 12 and the adjacent surfaces of the chamber 13.

Each of the inlet headers 28, 34, 46 and 48 of the hood is suitably supplied with water from a common inlet header 59, and the outlet headers 32A, 32B, 32C and 50 are suitably connected with the common collecting or outlet header 23 and thus into the circulatory system of heat exchange schematically shown in FIG. 1. As shown, the incoming water is delivered to the header 59 of the hood through a pipe 73 by a high pressure circulating pump 74, and the heated water is passed from the outlet header 23 to the pressurized drum 24.

Referring to FIG. 1, the heated water delivered to the tank or drum 24 will be at a reduced pressure and some of the water will flash to steam so that the water in the drum will be maintained at a desired pressure. Some of the water will be withdrawn from the drum 24 through a valved pipe 75, through a mixing T 76 to the suction side of the boiler circulating pump 74. When two hoods are used, as shown in FIG. 1, normal operation will result in only one furnace and its hood being used during any one period of time, although the gas cooling and flow directing system disclosed is constructed and arranged to permit overlapping operation of both furnaces. Since the heat absorbed in the water passing through the hood, or hoods, must be disposed of, heat exchange elements 77 are provided to dissipate the heat to the atmosphere. A controlled flow of hot water is withdrawn from the drum 24 through a conduit 78 to duplicate circulating pumps 80, with the pumps discharging through a pipe 81 to the heat exchangers 77. The exchangers 77 are constructed to pass the water through extended surface tubes over which is passed a controlled flow of cooling air. The heat transmitted to the cooling air is dissipated to the atmosphere with the total water cooling effect regulated by air flow control louvers 82 and the operation of blowers 83. The cooled water flows from the heat exchangers 77 through a pipe 84 to the mixing T 76 where the cooled water mixes with the water passing through the pipe 75, modifies the temperature of the water delivered to the inlet header 59, and thus to the hood cooling flow circuits.

It will be noted in FIG. 1 that two oxygen converter furnaces and two hood units are provided. The furnaces and hoods are substantial duplicates, and the different parts of the hoods are identified by the same numbers, with the numbers on one furnace and hood distinguished by primes ('). The heated fluids from both hoods discharge to the common drum 24 and a common heat exchange unit 77 which is used for both hoods. In the embodiment shown, the heat absorption rate for each hood 12 is 70,000,000 B.t.u. per hour with an operating cycle of heat emission from the furnace of 20,000,000 B.t.u. per 20 minute cycle. On this basis, and permitting some overlapping operation of both furnaces, the heat exchanger 77 is rated at 80,000,000 B.t.u. per hour.

The operation of the heat exchanger 77 is controlled by relays actuated by the pressure in the drum 24, as measured in a pressure controller 90, and by the temperature of the water mixture leaving the mixer 76, as measured by a temperature controller 91. Control impulses from the controllers 90 and 91 are transmitted to a master relay 92 which actuates the positioning of the louvers 82 by means of a power piston 94 and the operation of the fans 83 through relays 93. Ordinarily the fans will be operated only during and immediately following periods of heat absorption by the hoods 12 and 12'.

In the unit illustrated, when applied in connection with 150 ton furnaces, the pumps 74, 74' and 80 each have a capacity of 3000 gals. of water per minute at a differential pressure of 25 pounds per square inch and will deliver water to the hood at 450 p.s.i.a. (pounds per square inch absolute). The water discharged into the header 23 will be at a temperature substantially corresponding to the saturation temperature at the pressure prevailing in the header. Under some conditions some steam may be mixed in the water delivered to the header 23, but ordinarily such steam will be condensed in the header. When the water enters the lower pressure zone of the drum 24, some of the water will flash to steam to pressurize the drum and to maintain a generally uniform pressure on the water passed to the pumps 74, 74' and 80, as regulated by the pressure-temperature control system. In initial start up from a cold condition, pressurizing steam from an outside source may be introduced into the drum 24 to heat the water therein and to impose pressure on the inlets of the pumps 74 and 74'.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Gas cooling apparatus comprising, means forming a furnace for the emission of hot gases, wall means defining a flow path for said gases leaving said furnace, tubes positioned in said flow path and in heat exchange contact with said hot gases, means for circulating a vaporizable liquid heat exchange medium through said tubes, an expansion tank positioned above said wall means and adapted to receive the heated medium from said tubes substantially at the saturation temperature corresponding to the pressure of the medium leaving said tubes, said tank being maintained at a lower pressure than the heat exchange medium in said tubes to vaporize a portion of said liquid medium in said tank, pump means for continuously recirculating liquid medium from said tank to the tubes of said wall, and means for cooling a controlled separate portion of liquid medium withdrawn from said tank including an external heat exchanger, means for passing a separate cooling fluid through said external heat exchanger, means responsive to the pressure within said expansion tank and the temperature of said medium entering said tubes to control the rate of cooling within said external heat exchanger, and means for mixing said cooled liquid with said recirculated liquid for delivery to the tubes in said gas flow path, whereby the temperature of the mixed medium delivered to said tubes is regulated to compensate for the heat absorbed by the medium in passing through said tubes.

2. Gas cooling apparatus comprising, means forming a furnace for the emission of hot gases, a refractory lined chamber, wall means defined by tubes and confining the flow of said gases leaving said furnace for delivery to said chamber, means for circulating vaporizable liquid heat exchange medium through said tubes for discharge substantially at a saturation temperature corresponding with the pressure of the medium, an expansion tank positioned above said wall means and adapted to receive the heated medium from said tubes, means maintaining the heat exchange medium in said tank at a lower pressure than the medium discharging from said tubes to vaporize a portion of said liquid medium and to pressurize the liquid medium, pump means for continuously recirculating liquid medium from said tank to the tubes of said wall, and means for cooling a controlled separate portion of liquid medium withdrawn from said tank including an external heat exchanger, means for passing a separate cooling fluid through said external heat exchanger, means responsive to a measurement of the temperature of said medium entering said tubes as modified by a measurement of the pressure in said expansion tank to control the rate of cooling within said external heat exchanger, and means for mixing said cooled liquid with said recirculated liquid for delivery to the tubes of said wall means.

References Cited by the Examiner

FOREIGN PATENTS 629,298 9/1949 Great Britain.
890,869 3/1962 Great Britain.

OTHER REFERENCES

German printed application 1,063,191 (Guczky), printed 8/1959.

PERCY L. PATRICK, *Primary Examiner.*
MEYER PERLIN, ROBERT A. O'LEARY, *Examiners.*